United States Patent [19]

Cheon

[11] Patent Number: 5,465,921
[45] Date of Patent: Nov. 14, 1995

[54] BRAKE DEVICE FOR VIDEO CASSETTE TAPE RECORDER

[75] Inventor: In K. Cheon, Seoul, Rep. of Korea

[73] Assignee: Goldstar Co., Ltd., Seoul, Rep. of Korea

[21] Appl. No.: 175,570

[22] Filed: Dec. 30, 1993

[30] Foreign Application Priority Data

Dec. 31, 1992 [KR] Rep. of Korea ............... 1992-27118

[51] Int. Cl.[6] ........................................... G11B 15/48
[52] U.S. Cl. ................................................ 242/355.1
[58] Field of Search ......................... 242/355, 355.1, 242/355.2; 360/74.1, 96.3

[56] References Cited

U.S. PATENT DOCUMENTS

| | | | |
|---|---|---|---|
| 3,091,410 | 5/1963 | Widener | 242/355.1 |
| 3,930,269 | 12/1975 | Uemura | 242/355.1 |
| 3,938,756 | 2/1976 | Katoh | 242/355.2 |
| 4,807,061 | 2/1989 | Yoon | 242/355.1 |
| 4,899,951 | 2/1990 | Okada et al. | 242/355.2 |
| 5,114,093 | 5/1992 | Kunimaru et al. | 242/355.1 |
| 5,318,241 | 6/1994 | Morimoto | 242/355.1 |

*Primary Examiner*—John P. Darling

[57] ABSTRACT

A brake device for a VCR rapidly stopping the rotation of the supply reel and the take-up reel and reducing the number of brake shafts and brake springs. The brake device includes a supply reel soft brake and a supply reel main brake which are rotatably mounted on a common shaft at a side of the supply reel for braking the supply reel. A take-up reel soft brake and a take-up reel main brake are rotatably mounted on a common shaft at a side of the take-up reel for braking the take-up reel. The brake device further includes a pair of brake springs. One of the brake springs is mounted on the common shaft at the side of the supply reel and biases the supply reel brakes in opposed directions in order to make these supply reel brakes come into close contact with the supply reel. The other spring is mounted on the common shaft at the side of the take-up reel and biases the take-up reel brakes in opposed directions in order to make the take-up reel brakes come into close contact with the take-up reel.

2 Claims, 3 Drawing Sheets

5,465,921

BRAKE DEVICE FOR VIDEO CASSETTE TAPE RECORDER

BACKGROUND OF THE INVENTION

1. Field of the Invention

The present invention relates in general to a deck mechanism of a video cassette tape recorder, and more particularly to a brake device of the deck mechanism of the video cassette tape recorder for stopping a tape supply reel and a tape take-up reel of the deck mechanism.

2. Description of the Prior Art

As well known to those skilled in the art, a video cassette tape recorder (hereinbelow, referred to simply as "the VCR") is operated in various of operational modes, that is, FF, REW, PLAY, REV and PAUSE modes. When an operational mode of the VCR is changed into another operational mode, various functional elements of the deck mechanism of the VCR should move to their predetermined positions where they perform their intrinsic functions in the selected operational mode.

With reference to FIG. 1, there is shown in a schematic plan view a brake device of a deck mechanism of the VCR in accordance with the prior art. In this drawing, the reference numerals 1 and 2 denote a tape supply reel and a tape take-up reel of the deck mechanism which are placed on a reel table or on a reel stand of the deck mechanism. A pair of reels of a tape cassette loaded on the deck mechanism engage with the supply reel 1 and the take-up reel 2, respectively. At a side of the supply reel 1, a supply reel soft brake 3 is pivoted on a supply reel brake shaft 5. This supply reel soft brake 3 is biased toward the supply reel 1 by a supply reel soft brake spring 6 such that it comes into close contact with the supply reel 1. A supply reel main brake 4 is mounted on a supply reel main brake shaft 7. In the same manner, at a side of the take-up reel 2, a take-up reel soft brake 13 i s pi voted on a take-up reel brake shaft 12. This take-up reel soft brake 13 is biased toward the take-up reel 2 by a take-up reel soft brake spring 11 such that it comes into contact with the take-up reel 2. A take-up reel main brake 10 i s mounted on a take-up reel main brake shaft 9. The supply reel main brake 4 and the take-up reel main brake 10 have their brake shoes which are mounted on ends of the brakes 4 and 10 adjacent to the supply reel 1 and the take-up reel 2, respectively.

The supply reel main brake 4 and the take-up reel main brake 10 are connected to each other by a main brake spring 8 which is a kind of tension coil spring and connected to a pair of brake pins 20 at its opposed ends. Such a connection between the supply reel main brake 4 and the take-up reel main brake 10 is achieved at the other ends of the brakes 4 and 10 which are spaced apart from the reels 1 and 2, respectively. Due for the spring force of the spring 8, the main brakes and 10 are biased in opposite directions.

In addition, a function plate 14 is provided for the deck mechanism at a position above the supply reel 1 and the take-up reel 2 such that it linearly reciprocates. The supply reel soft brake 5 and the take-up reek soft brake 13 are provided at, their ends with individual brake pins. In order to contact and cooperate with these brake pins of the soft brakes 5 and 13, the function plate 14 has a protrusion and a pair of recesses, the recesses being formed at opposite sides of the protrusion. Since the supply reel main brake 4 and the take-up reel main brake 10 are connected to each other by the main brake spring 8, these main brakes 4 and 10 come into close contact with the supply reel 1 and the take-up reel 2 at the ends thereof, respectively. The above brake device further includes a FF mode plate 15 cooperating with both the supply reel main brake 4 and the take-up reel main brake 10.

The supply reel main brake 4 and the take-up reel main brake 10 are used for stopping the reels 1 and 2 when either of PLAY, FF and REW (Rewind) modes is finished. The supply reel soft brake 3 is used for a loading operation of the deck mechanism and the take-up reel soft, brake 13 is used in the REV mode.

In the above brake device, when the function plate 14 and the FF mode plate 15 linearly reciprocate by forces F1 and F2 in accordance with a selected operational mode, respectively, the soft brakes 3 and 13 and the main brakes 4 and 10 are rotated about their rotating shafts by the function plate 14 and the FF mode plate 15, respectively. At this time, the braking forces applied to both the supply reel 1 and the take-up reel 2 are influenced by the spring forces of the springs.

However, the prior art brake device has a problem in that it requires large number of elements since two soft brakes 3 and 13 and two main brakes 4 and 10 are separately placed on the deck mechanism as described above. The requirement of the large number of elements causes the fabrication of the brake device to be complex and difficult. Furthermore, the preparation process of the brake device is inevitably increased in the number of its steps for assembling the elements, so that the cost of the device is inevitably increased.

SUMMARY OF THE INVENTION

It is, therefore, an object of the present invention to provide a brake device for a VCR in which the aforementioned problem can be overcome arid which rapidly stops the rotation of the supply reel and the take-up reel, and reduces the number of brake shafts and brake springs.

In order to accomplish the above object, a brake device for a VCR having a supply reel and a take-up reel in accordance with an embodiment of the present invention comprises a supply reel soft brake and a supply reel main brake which are rotatably mounted on a common shaft, at a side of the supply reel for braking the supply reel, a take-up reel soft brake and a take-up reel main brake which are rotatably mounted on a common shaft, at a side of the take-up reel for braking the take-up reel, and a pair of brake springs, one of the springs being mounted on the common shaft at the side of the supply reel and biasing the supply reel brakes in opposite directions in order to make these supply reel brakes come into contact with the supply reel, and the other spring being mounted on the common shaft at the side of the take-up reel and biasing the take-up reel brakes in opposite directions in order to make the take-up reel brakes come into contact with the take-up reel.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
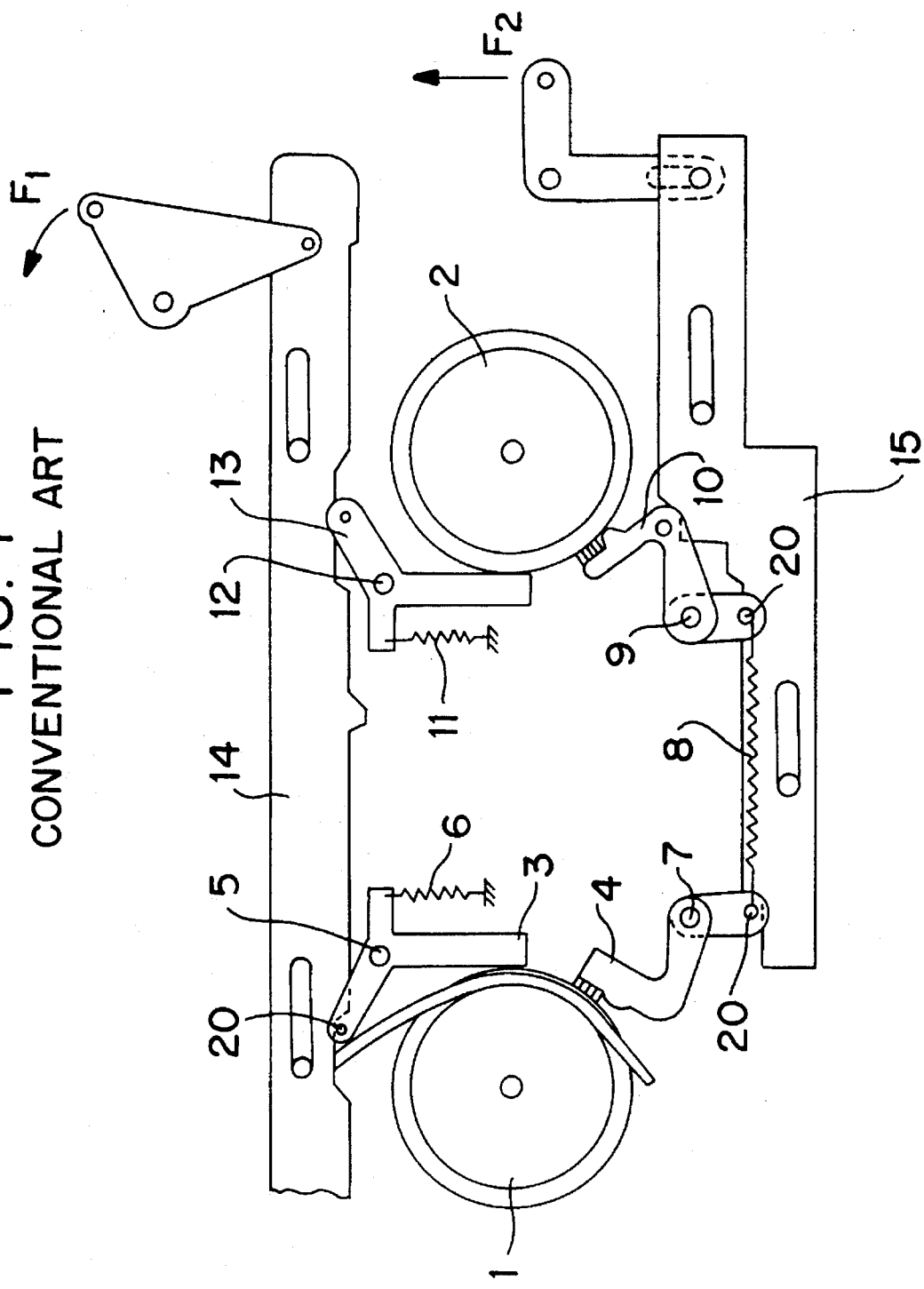
FIG. 1 is a schematic plan view of a brake device for a VCR in accordance with the prior art.
Figure 2:
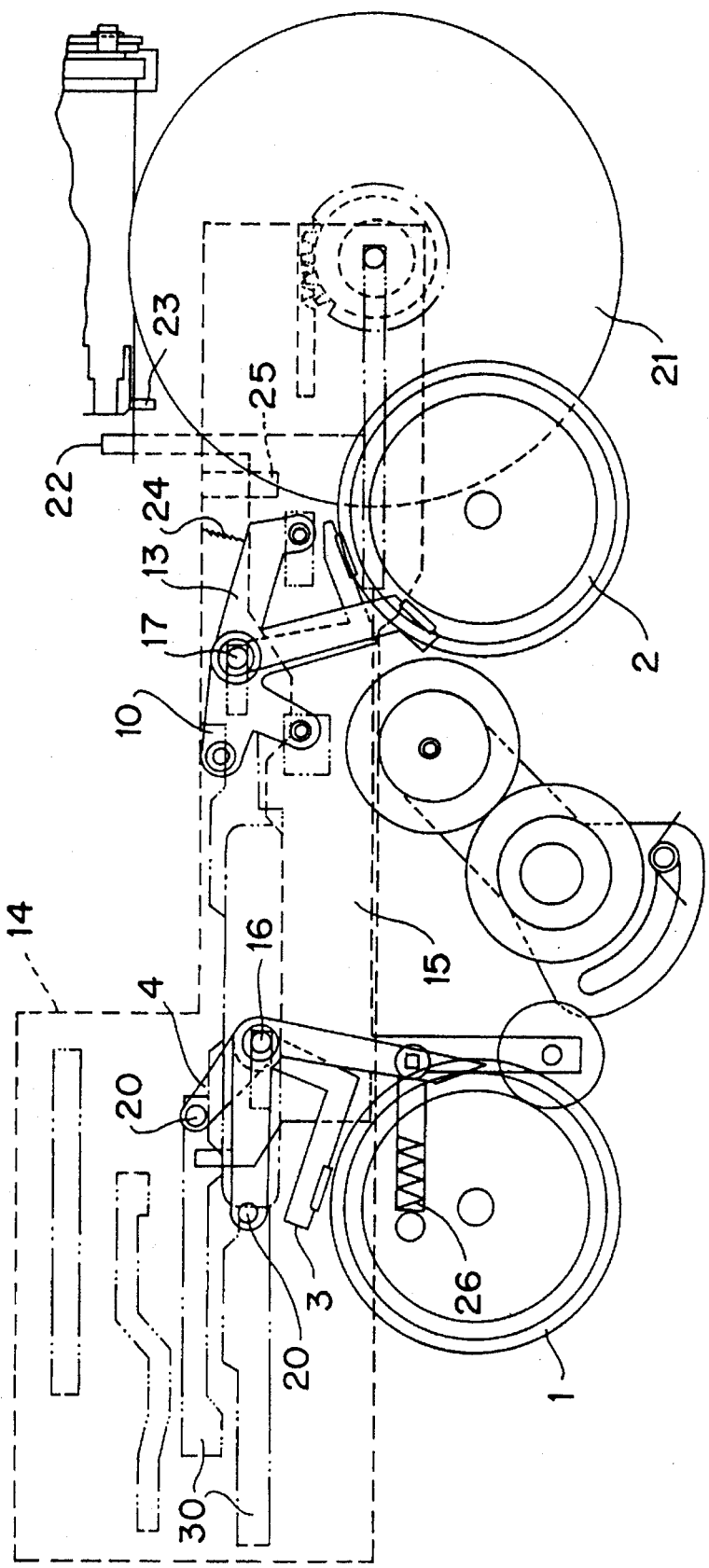
FIG. 2 is a plan view of a brake device for a VCR in accordance with an embodiment of the present invention.
Figure 3A:
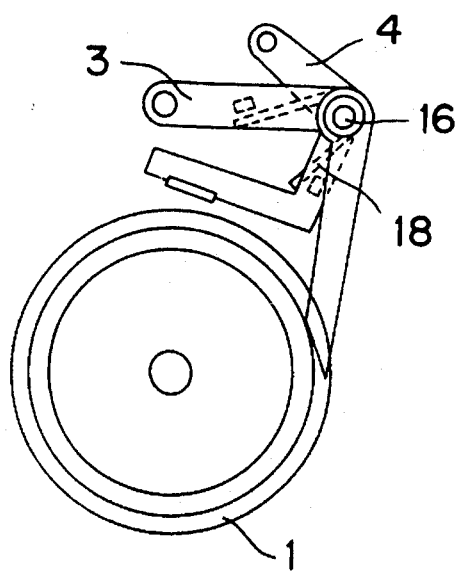
FIGS. 3A and 3B are partially enlarged plan views of the brake device of FIG. 2.
Figure 3B:
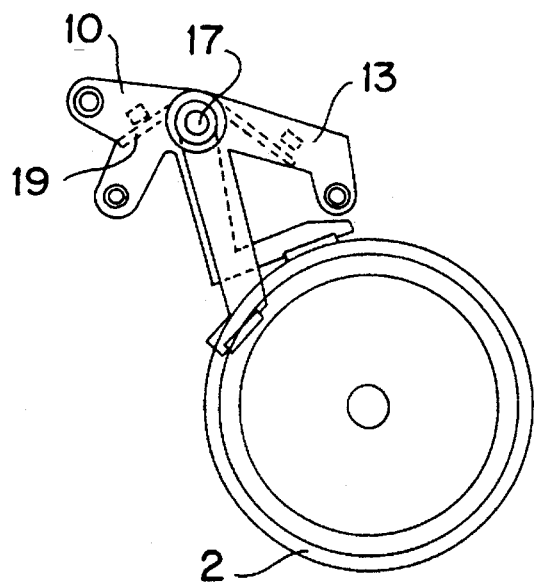
Figure 4:
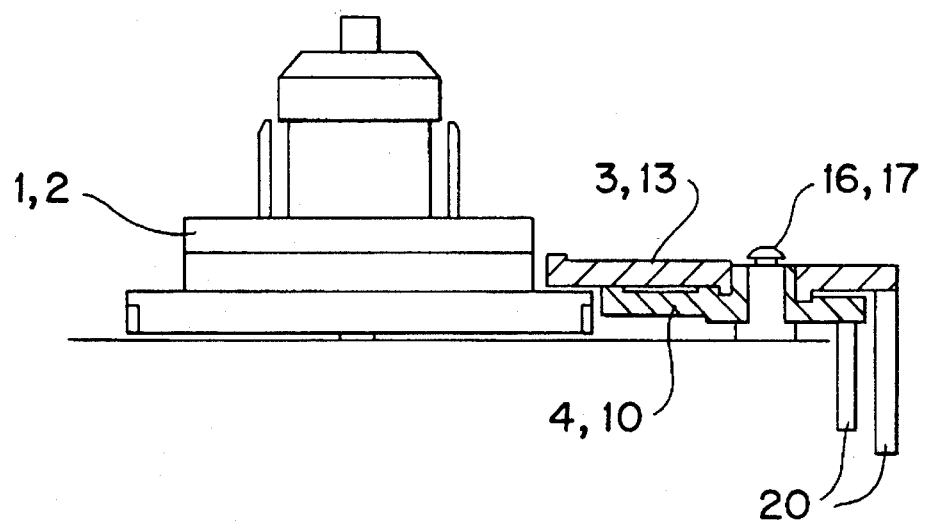
FIG. 4 is an enlarged side sectional view of the brake device of FIG. 2.

FIG. 2 is a plan view of a brake device for a VCR in accordance with an embodiment of the present invention FIGS. 3A and 3B are partially enlarged plan views of the brake devices of of the supply reel and take-up reel, respectively, of FIG. 2. FIG. 4 is an enlarged side sectional view of the brake device of FIG. 2. As shown in these drawings, the brake device includes a supply reel soft brake 3 and a supply reel main brake 4 which are rotatably mounted on a common shaft 16 at a side of the a tape supply reel 1. The supply reel soft brake 3 and the supply reel main brake 4 are biased in opposite directions by a supply reel brake spring 18 or a torsion spring such that they come into contact with the supply reel 1. The torsion spring 18 is mounted on the common shaft 16 and caught at its ends by spring support protrusions of the brakes 3 and 4.

Similarly, a take-up reel soft brake 13 and a take-up reel main brake 10 are mounted on a common shaft 17 at a side of the a tape take-up reel 2. The take-up reel soft brake 13 and the take-up reel main brake 10 are biased in opposite directions by a take-up reel brake spring 19 or a torsion spring such that they come into contact with the take-up reel 2. The torsion spring 19 is mounted on the common shaft 17 and caught at its ends by spring support protrusions of the brakes 10 and 13.

The brake device further includes a function plate 14 and a FF mode plate 15 which are provided with prominences and depressions for coming cooperating with brake pins 20 of the brakes 3, 4, 10 and 13.

In the drawings, the reference numeral 22 denotes a lever plate, the numeral 23 denotes a trigger, the numeral 24 denotes a lever plate spring, the numeral 25 denotes a protrusion of the function plate 14, and the numeral 26 denotes a return spring of the FF mode plate 15.

In the brake device, the supply reel main brake 4 and the take-up reel main brake 10 are used for stopping the supply reel 1 and the take-up reel 2 when either of FF and REW modes is finished, the supply reel soft brake 3 is used for loading and unloading operations of the deck mechanism, and the take-up reel soft brake 13 is used for the Rev (Reverse) mode as described for the prior art brake device. However, this brake device desirably reduces the number of the shafts supporting all the brakes from four to two, and reduces the number of the springs biasing the brakes from three to two.

When the function plate 14 and the FF mode plate 15 linearly reciprocate in accordance with a selected mode, the soft, brakes 3 and 13 and the main brakes 4 and 10 cooperate with the prominences and depressions of the plates 14 and 15, respectively, thus to rotate about their rotating shafts and to stop the reels 1 and 2. When the brakes are operated as described above, the braking forces applied to both the supply reel 1 and the take-up reel 2 are influenced by the spring forces of the springs 18 and 19, respectively. A braking force applied to a reel 1 or 2 is determined by a ratio of distances from a corresponding common shaft, 16 or 17 to the spring support, protrusions at which a corresponding spring 18 or 19 is caught at its opposed ends. Brake pins 20 move in guide grooves 30. In the operation of the brake device, when the deck mechanism is to perform a FF mode, the rotational force of a loading motor (not shown) is transmitted to a wheel 21 (FIG. 2), thus to rotate this wheel 21. Here, since a gear of the wheel 21 gears into a gear of the function plate 14, the rotation of the wheel 21 causes a linear movement, of the function plate 14. As a result, of the linear movement, of the function plate 14, the protrusion 25 of the function plate 14 pushes the lever plate 22, thus to cause a linear movement of the FF mode plate 15 so as to engage with the lever plate 22. When the FF mode plate 15 linearly moves, its prominences and depressions push the brakes and separate these brakes from the reels 1 and 2.

Thereafter, the loading motor is rotated in the reverse direction, so that the trigger 23 forcibly pushes an end of the lever plate 22, thus to separate the lever plate 22 from the protrusion 25 of the function plate 14. Hence, the FF mode plate 15 returns to its original position by the spring force of its return spring 26 and stops its 1 i near movement. Thereafter, only the function plate 14 moves, so that the brakes are operated by the moving function plate 14 in order to come into contact with or to be separated from the reels 1 and 2.

In this case, the braking force is determined by the spring forces of the springs 18 and 19 as well as by a brake moment represented by the relation M=rF. It is apparent from the above relation M=rF that the moment M is proportional to the radius r. In this brake device, it is thus possible appropriately use the forces F which are to required by the brakes.

As described above, in accordance with a brake device for a VCR of the present invention, a supply reel soft brake and a supply reel main brake are rotabably mounted on a common shaft and, in similar manner, a take-up reel soft brake and a take-up reel main brake are rotatably mounted on a common shaft, thus reducing the number of the shafts supporting the brakes. The brakes corresponding to the supply reel are biased by a common spring and the brakes corresponding to the take-up reel are biased by a common spring, thus to reducing the number in the springs biasing the brakes. Due to the reduction in the number of shafts and springs, the manufacturing cost of the VCR is remarkably reduced and fabrication of the brake device is easily achieved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A brake device for a video cassette tape recorder, said recorder having a supply reel and a take-up reel rotatably mounted on a base plate, comprising:

a wheel driven by a motor, said motor including a rotating force transmitting means:

a first brake and a first main brake both rotatably mounted on a common shaft at a side of said supply reel;

a second brake and a second main brake both rotatably mounted on a common shaft at a side of said take-up reel;

a resilient means for providing different brake forces to the first and second brakes and the first and second main brakes, said resilient means being mounted on the common shafts of said supply reel and said take-up reel;

a function means having guide grooves formed therein, for driving the first and second brakes, said function means being linearly movable by a movement of the wheel; and an actuating means operatively in contact with the function means, said actuating means being operated by the rotating force transmitting means of the motor.

2. The brake device as claimed in claim 1, wherein said resilient means is a torsion spring which can be inserted into a common shaft, said resilient means comprising a long end portion which supports one of the first brake and second brake and a short end portion which supports one of the first main brake and second main brake, respectively.

* * * * *